(12) United States Patent
Amin et al.

(10) Patent No.: US 11,261,129 B2
(45) Date of Patent: *Mar. 1, 2022

(54) METHODS FOR REDUCING SURFACE DEFECTS

(71) Applicant: CORNING INCORPORATED, Corning, NY (US)

(72) Inventors: Jaymin Amin, Corning, NY (US); Yuhui Jin, Painted Post, NY (US); Kristy Lynn Smith, Bath, NY (US)

(73) Assignee: Corning Incorporated, Corning, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/506,116

(22) Filed: Jul. 9, 2019

(65) Prior Publication Data

US 2019/0330105 A1 Oct. 31, 2019

Related U.S. Application Data

(62) Division of application No. 15/672,567, filed on Aug. 9, 2017, now Pat. No. 10,351,472.

(Continued)

(51) Int. Cl.
*C03C 21/00* (2006.01)
*C03C 3/093* (2006.01)
(Continued)

(52) U.S. Cl.
CPC ............ *C03C 21/002* (2013.01); *C03C 3/093* (2013.01); *C03C 3/097* (2013.01); *C03C 4/18* (2013.01);
(Continued)

(58) Field of Classification Search
None
See application file for complete search history.

(56) References Cited

U.S. PATENT DOCUMENTS

| 3,441,398 A | 4/1969 | Hess |
| 2010/0009154 A1 | 1/2010 | Allan et al. |

(Continued)

FOREIGN PATENT DOCUMENTS

| JP | 2015129063 A | 7/2015 |
| WO | 2014045977 A1 | 3/2014 |

(Continued)

OTHER PUBLICATIONS

International Search Report of the International Searching Authority; PCT/US2017/046179; dated Oct. 18, 2017; 11 Pages; European Patent Office.

(Continued)

*Primary Examiner* — Lisa L Herring
(74) *Attorney, Agent, or Firm* — Jeffrey A. Schmidt (57) ABSTRACT

Methods for reducing a defective area in a strengthened substrate to produce a non-defective substrate are provided. The methods include contacting a strengthened defective substrate with a heated salt bath containing at least one monovalent salt, and removing the strengthened substrate from the bath. The strengthened substrate, before being contacted with the salt bath, is a defective substrate having at least one defective area and one or more non-defective area. Upon removal from the salt bath, at least one defective area has been reduced or substantially removed to produce a non-defective substrate.

16 Claims, 6 Drawing Sheets

Related U.S. Application Data (60) Provisional application No. 62/373,025, filed on Aug. 10, 2016.

(51) Int. Cl.
  *C03C 3/097* (2006.01)
  *C03C 4/18* (2006.01)

(52) U.S. Cl.
  CPC ........ *C03C 21/005* (2013.01); *C03C 2204/00* (2013.01)

(56) References Cited

U.S. PATENT DOCUMENTS

| | | |
|---|---|---|
| 2012/0052271 A1 | 3/2012 | Gomez et al. |
| 2015/0239776 A1 | 8/2015 | Amin et al. |
| 2015/0344351 A1 | 12/2015 | Comte et al. |
| 2016/0355434 A1* | 12/2016 | Momono ............... B32B 17/06 |

FOREIGN PATENT DOCUMENTS

| | | | |
|---|---|---|---|
| WO | WO-2014081647 A1 * | 5/2014 | ............... C03C 8/16 |
| WO | 2015080095 A1 | 6/2015 | |
| WO | 2017087742 A1 | 5/2017 | |

OTHER PUBLICATIONS

Volkovich et al; "Treatment of Molten Salt Wastes By Phosphate Precipitation: Removal of Fission Product Elements After Pyrochemical Reprocessing of Spent Nuclear Fuels in Chloride Melts"; Journal of Nuclear Materials; 323 (2003) 49-56.

* cited by examiner

FIG. 6 ic # METHODS FOR REDUCING SURFACE DEFECTS

CROSS-REFERENCE TO RELATED APPLICATIONS

This application is a divisional application and claims the benefit of priority under 35 U.S.C. § 120 of U.S. application Ser. No. 15/672,567 filed on Aug. 9, 2017, which in turn, claims the benefit of priority under 35 U.S.C. § 119 of U.S. Provisional Application Ser. No. 62/373,025 filed on Aug. 10, 2016, the contents of each of which are relied upon and incorporated herein by reference in their entireties.

TECHNICAL FIELD

The present disclosure generally relates to methods for reducing surface defects. More particularly, the disclosure relates to methods for reducing surface defects in ion-exchanged or otherwise strengthened substrates.

BACKGROUND

Tempered or strengthened glass is often used in consumer electronic devices, such as smart phones and tablets, due to its physical and chemical durability. However, the strengthening process can place glass under significant stress, which may propagate surface irregularities or other defects. Surface defects may alter both the appearance and the strength of the glass. If a glass article cannot meet the aesthetic or functional demands required in electronic devices because of the surface defects, the glass may be unusable and may have to be discarded as scrap material. Accordingly, a need exists for reducing or removing surface defects in substrates.

SUMMARY

Embodiments described herein address these needs by providing methods for reducing surface defects in ion-exchanged or otherwise strengthened substrates by contacting a defective substrate with a heated salt bath comprising at least one monovalent salt.

In some embodiments, a method is provided for removing a defective area in a strengthened substrate by heating a salt bath comprising at least one monovalent salt to a temperature of greater than or equal to 95° C., contacting the strengthened substrate with the heated salt bath, and removing the strengthened substrate from the heated salt bath. The strengthened substrate, before being contacted with the heated salt, has at least one defective area and one or more non-defective area, where the non-defective areas have an average metal monovalent cation concentration, and the defective area deviates from that average by at least 10 mol %. Upon removal of the substrate from the heated salt bath, the defective area deviates from the average by less than 10 mol %, effectively removing the defective area. As used herein, the term "deviate" means the absolute value of the difference in concentrations between the at least one defective area and one or more non-defective area.

In some embodiments, a method is provided for producing a non-defective ion-exchanged substrate by heating a salt bath comprising at least one monovalent salt to a temperature of greater than or equal to 95° C. and less than or equal to 430° C., contacting the ion-exchanged substrate with the heated salt bath, and removing the ion-exchanged substrate from the heated salt bath. The ion-exchange substrate, before being contacted with the heated salt bath, is a defective ion-exchanged substrate having an Arithmetic Average Roughness (Ra) of greater than or equal to about 0.002 µm, as measured over an area having dimensions of 0.18 mm by 0.13 mm. Upon removal from the heated salt bath, the ion-exchanged substrate is a non-defective ion-exchanged substrate having an Ra of less than 0.002 µm.

DETAILED DESCRIPTION

Embodiments described herein are directed to methods for reducing surface defects in ion-exchanged or otherwise strengthened glass substrates. Some embodiments of the present disclosure provide methods for reducing surface defects in ion-exchanged or otherwise strengthened substrates by contacting a defective substrate with a heated salt bath comprising at least one monovalent salt.

In general, the durability of tempered glass and glass-ceramic substrates is increased by increasing the amount of compressive stress (CS) and the depth of compression (DOC) of the glass or glass-ceramic substrate. To provide a larger CS and increase the DOC, ion exchange processes may be used as the strengthening process for glass or glass-ceramic substrates. As used herein, DOC means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM, and is called potassium depth of layer (DOL).

In ion exchange processes, a glass or glass-ceramic substrate containing at least one smaller alkali metal ion is contacted with a salt containing at least one larger alkali metal ion. The smaller alkali metal ions diffuse from the glass surface into the salt while larger alkali metal ions from the salt replace these smaller ions in the surface of the glass. This substitution of larger ions for smaller ions in the glass creates a compressive stress layer at the glass surface, thus increasing the resistance of the glass to breakage. As the ion exchange process proceeds, the salt concentration of the smaller alkali metal ions in the salt (i.e., the ions that diffuse from the glass into the salt) increases while the concentration of the larger alkali metal ions in the salt (i.e., the ions that migrate into the glass from the salt) decreases.

During strengthening processes, such as ion exchange processes, ideally a uniform layer of compressive stress is generated across the surface of the glass. However, the stress induced may sometimes be distributed non-uniformly, instead concentrating a high degree of stress in one localized area, which may generate defects in the surface of the glass. Surface defects, such as depressions or protrusions, may form due to the variance in ion volume as the ions are exchanged, as smaller ions replacing larger ions may leave a void or depression in the surface of the substrate. Additionally, some salts present in the salt bath may crystallize on the surface of the glass following the ion exchange process. Once the substrate has cooled, it may be difficult to remove the crystals from the surface, which can generate depressions and protrusions in the glass. Dimpled, stippled glass is often not commercially desired and may not be usable in some industries.

In some embodiments, a method is provided for reducing a defective area in a strengthened substrate by contacting a strengthened substrate with a heated salt bath, and removing the strengthened substrate from the bath. The strengthened substrate, before being contacted with the heated salt, has at least one defective area and one or more non-defective area. Upon removal from the bath, the at least one defective area has been removed or substantially reduced.

In some embodiments, a method is provided for producing a non-defective ion-exchanged substrate by contacting an ion-exchanged substrate with the heated salt bath and removing the ion-exchanged substrate from the bath. The ion-exchange substrate, before being contacted with the heated salt bath, is a defective ion-exchanged substrate having an Ra of greater than or equal to about 0.002 μm. Upon removal from the salt bath, the ion-exchanged substrate is a non-defective ion-exchanged substrate having an Ra of less than 0.002 μm.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the terms "substrate" and "article" are, unless otherwise specified, equivalent terms, referring to a glass or glass-ceramic material of any shape or form including, but not limited to, sheets, vials, and three dimensional glass articles.

As used herein, the terms "cation" and "ion" are considered equivalent terms, unless otherwise specified. The terms "cation" and "ion" can also refer to one or more cations.

As used herein, the terms "ion exchange bath," "salt bath," and "heated salt bath," are, unless otherwise specified, equivalent terms, and refer to the solution or medium used to effect the ion exchange process with a glass or glass-ceramic substrate, in which ions within the surface of a glass or glass-ceramic substrate are replaced or exchanged with ions that are present in the salt bath, which may be a molten salt bath or an aqueous salt bath.

As used herein, the terms "selectively" and "selective" are used to refer to the affinity for a product or reaction mechanism to be promoted, such that the particular product or reaction mechanism occurs over other potential products or reactions.

Specific embodiments will now be described with reference to the figures. The following description of the embodiments is illustrative in nature and is in no way intended to be limiting in its application or use. Furthermore, where applicable, like reference numbers indicate corresponding or related parts in the various figures.

Figure 1A:
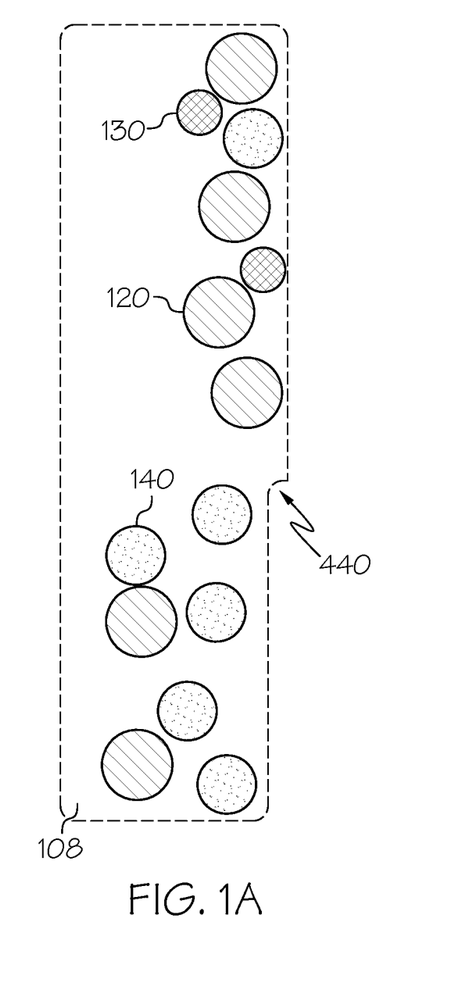
FIG. 1A schematically depicts a defective ion-exchanged substrate, according to embodiments disclosed and described herein.

FIG. 1A schematically depicts a defective ion-exchanged substrate 108. In some embodiments, the defective ion-exchanged substrate 108 may have an Ra of greater than or equal to 0.002 μm. As used herein, $R_a$ is defined as the arithmetic average of the differences between the local surface heights and the average surface height and can be described by the following equation:

$$R_a = \frac{1}{n}\sum_{i=1}^{n} |y_i| \qquad \text{EQUATION 1}$$

wherein $y_i$ is the local surface height relative to the average surface height.

In some embodiments, the defective ion-exchanged substrate 108 may have an Ra of greater than or equal to 0.005 μm, or greater than or equal to 0.01 μm, or greater than or equal to 0.05 μm. These values are as measured over an area having dimensions of 0.18 mm by 0.13 mm. The defective ion-exchanged substrate 108 may, in some embodiments, comprise glass, glass-ceramic, or other suitable compositions. While FIG. 1A depicts an ion-exchanged substrate, it should be understood that other strengthened substrates may be used.

In FIG. 1A, the defective ion-exchanged substrate 108 has a defect 440. While the defect 440 depicted in FIG. 1A is a depression, it should be understood that the defect 440 may be a protrusion. In some embodiments, the defective ion-exchanged substrate 108 may contain one or more defects 440, such as multiple depressions and/or protrusions. In some embodiments, a depression generated in one surface of a substrate may produce a protrusion on an opposite surface of the substrate. This may particularly occur in thin substrates, such as substrates having a thickness of less than or equal to 150 μm, for example, less than or equal to 100 μm, or less than or equal to 75 μm, or less than or equal to 50 μm.

In some embodiments, the defect 440 may be a depression or a protrusion having a height or depth of greater than or equal to at least 1.2 nm and a width or length of greater than or equal to at least 0.005 mm. The defect 440 may have a height or depth of from 1 nm to 200 nm, or from 1 nm to 100 nm, or from 1 nm to 10 nm. In some embodiments, the defect 440 may have a height or depth of from about 10 nm to about 50 nm, or from about 100 nm to about 50 nm, or from 100 nm to 200 nm. The defect 440 may have a width or length of from 0.1 µm to 5 µm, or from 0.1 µm to 50 µm, or from 0.1 µm to 0.5 mm. In some embodiments, the defect 440 may have a width or length of from 0.1 to 0.5 mm, or from 0.05 to 0.1 mm, or from 0.05 to 0.5 mm, or from 0.001 to 0.5 mm. In some embodiments, the defects 440 may be visible to the unassisted eye. In other embodiments, the defects 440 may only be visible when placed under a green light or using a microscope or another magnifying lens.

Without being bound by any particular theory, a defect 440 may be caused by a disproportionate concentration of cations in a particular area of the defective ion-exchanged substrate 108. Various ions are present in the defective ion-exchanged substrate 108, including large metal monovalent cations 120 and small metal monovalent cations 130. The large metal monovalent cations 120, the small metal monovalent cations 130, or both, may, in some embodiments, be alkali metals, such as sodium, lithium potassium, rubidium, cesium or francium. In some embodiments, the large metal monovalent cations 120, the small metal monovalent cations 130, or both, may be silver (Ag(I)), gold (Au(I)), or copper (Cu(I)).

In some embodiments, the defective ion-exchanged substrate 108 may further comprise medium-sized metal monovalent cations 140, as shown in FIG. 1A. The medium-sized metal monovalent cations 140, like the large metal monovalent cations 120 and the small metal monovalent cations 130, may comprise alkali metals, other monovalent metals, or combinations thereof. The defective ion-exchanged substrate 108 may comprise two or more, or three or more, or in some embodiments, even four or more metal monovalent cations.

In some embodiments, a disproportionate concentration of at least one type of cation in a particular area of the defective ion-exchanged substrate 108 constitutes a defective area, whereas a uniform distribution of cations in particular area constitutes a non-defective area. The defective ion-exchanged substrate 108 may comprise at least one defective area and one or more non-defective areas. The defective area may be a defect 440 or may comprise multiple defects 440, whereas the non-defective areas do not comprise a defect 440.

In some embodiments, the at least one defective area may comprise a majority (at least 51%) of one type of metal monovalent cation, such as the medium-sized metal monovalent cations 140 depicted in FIG. 1A. In some embodiments, the at least one defective area may comprise a homogenous concentration of one metal monovalent cation. In contrast, the non-defective areas may be comprised of a heterogeneous composition that does not comprise a majority (at least 51%) of one metal monovalent cation, but rather has a more uniformly-distributed assortment of three or more metal monovalent cations. In embodiments containing two metal monovalent cations, the defective area may be comprised of at least 60 mol % of one metal monovalent cation, where the non-defective area may be comprised of less than 60 mol % of any one metal monovalent cation.

In some embodiments, the one or more non-defective areas may be characterized by an average metal concentration, and the at least one defective area may deviate from the average metal concentration by greater than or equal to 10 mol %. As used herein, "average metal concentration" refers to the average concentration of each individual type of metal monovalent cation present in the given area as compared to the total sum of the individual metal monovalent cations in that given area.

As a non-limiting example, the one or more non-defective areas may, for instance, be comprised of two areas where the first non-defective area contains 34 mol % lithium cations, 31 mol % potassium cations, and 35 mol % sodium cations and the second non-defective area contains 35 mol % lithium cations, 32 mol % potassium cations, and 33 mol % sodium cations. The average metal monovalent cation concentration for the one or more non-defective areas in this example would be 34.5 mol % lithium, 31.5 mol % potassium, and 34 mol % sodium. The at least one defective area may deviate from the non-defective area by at least 10 mol %. For instance, the defective area could deviate from the lithium concentration by at least 10 mol % (having less than or equal to 24.5 mol % or greater than or equal to 44.5 mol % lithium), and/or the potassium content by at least 10 mol % (having less than or equal to 21.5 mol % or greater than or equal to 41.5 mol % potassium), and/or the sodium content by at least 10 mol % (having less than or equal to 24 mol % or greater than or equal to 44 mol % sodium). While lithium, potassium and sodium ions and salts are used in the embodiments shown and described herein, it should be understood that embodiments of the disclosure are not limited to these species.

In some embodiments, the average metal monovalent cation concentration of the at least one defective area may differ in composition from the concentration of the one or more non-defective areas by at least 15 mol %, or at least 20 mol % or at least 25 mol %, or at least 30 mol %. In some embodiments, the concentrations may differ by at least 45 mol %, or at least 60 mol %, or at least 75 mol %.

In some embodiments, non ion-exchangeable cations, such as alkali earth metals (Be, Mg, Ca, Sr, Ba, and Ra) may contribute to the formation of the defect 440. Without being bound by any particular theory, non ion-exchangeable cations present in the salt bath, the defective ion-exchanged substrate 108, or both, may block or otherwise prevent the exchange of the monovalent metal cations. In some embodiments, the blockage caused by the non ion-exchangeable cations may cause a surplus concentration of one type of metal monovalent cation in the defective area to create a defect 440, as previously discussed.

In some embodiments, the defective area may comprise greater than or equal to 60 mol % of a first metal monovalent cation, and the non-defective areas may comprise less than 60 mol % of any metal monovalent cations (including alkali metals: lithium, sodium, potassium, cesium, rubidium, and francium). As previously mentioned, the concentration in the defective areas may be homogenous or may comprise a majority (at least 51%) of a first metal monovalent cation, such as the medium-sized metal monovalent cations 140.

In some embodiments, the defective ion-exchanged substrate 108 may be a glass or glass-ceramic substrate or article. In some embodiments, the defective ion-exchanged substrate 108 may comprise alkali aluminosilicate or alkali aluminoborosilicate glass. For example, in some embodiments, the defective ion-exchanged substrate 108 may be formed from a glass composition which includes greater than or equal to 50 mol % $SiO_2$ and less than or equal to 80 mol % $SiO_2$, greater than or equal to 0 mol % $B_2O_3$ and less than or equal to 5 mol % $B_2O_3$, greater than or equal to 5 mol % $Al_2O_3$ and less than or equal to 30 mol % $Al_2O_3$, greater than or equal to 2 mol % $Li_2O$ and less than or equal to 25 mol % $Li_2O$, greater than or equal to 0 mol % $Na_2O$ and less than or equal to 15 mol % $Na_2O$, greater than or equal to 0 mol % MgO and less than or equal to 5 mol % MgO, greater than or equal to 0 mol % ZnO and less than or equal to 5 mol % ZnO, greater than or equal to 0 mol % $SnO_2$ and less than or equal to 5 mol % $SnO_2$, and greater than or equal to 0 mol % $P_2O_5$ and less than or equal to 10 mol % $P_2O_5$.

Alternatively, the defective ion-exchanged substrate 108 may comprise greater than or equal to 60 mol % $SiO_2$ and less than or equal to 75 mol % $SiO_2$, greater than or equal to 0 mol % $B_2O_3$ and less than or equal to 3 mol % $B_2O_3$, greater than or equal to 10 mol % $Al_2O_3$ and less than or equal to 25 mol % $Al_2O_3$, greater than or equal to 2 mol % $Li_2O$ and less than or equal to 15 mol % $Li_2O$, greater than or equal to 0 mol % $Na_2O$ and less than or equal to 12 mol % $Na_2O$, greater than or equal to 0 mol % MgO and less than or equal to 5 mol % MgO, greater than or equal to 0 mol % ZnO and less than or equal to 5 mol % ZnO, greater than or equal to 0 mol % $SnO_2$ and less than or equal to 1 mol % $SnO_2$, and greater than or equal to 0 mol % $P_2O_5$ and less than or equal to 5 mol % $P_2O_5$. It should be understood that, in some embodiments, the defective ion-exchanged substrate 108 may not comprise $B_2O_3$, $P_2O_5$, MgO, ZnO, $SnO_2$, or combinations thereof.

In some embodiments, the defective ion-exchanged substrate 108 may comprise greater than or equal to 55 mol % $SiO_2$ and less than or equal to 70 mol % $SiO_2$, greater than or equal to 0 mol % $B_2O_3$ and less than or equal to 5 mol % $B_2O_3$, greater than or equal to 10 mol % $Al_2O_3$ and less than or equal to 20 mol % $Al_2O_3$, greater than or equal to 2 mol % $Li_2O$ and less than or equal to 10 mol % $Li_2O$, greater than or equal to 1 mol % $Na_2O$ and less than or equal to 15 mol % $Na_2O$, greater than or equal to 0 mol % MgO and less than or equal to 5 mol % MgO, greater than or equal to 0 mol % ZnO and less than or equal to 5 mol % ZnO, greater than or equal to 0 mol % $SnO_2$ and less than or equal to 5 mol % $SnO_2$, and greater than or equal to 0.5 mol % $P_2O_5$ and less than or equal to 10 mol % $P_2O_5$.

It should be understood that the aforementioned glass composition is one embodiment of a glass composition that may be used in the ion exchange process and that other glass compositions for use with the methods described herein are contemplated and possible.

Figure 1B:
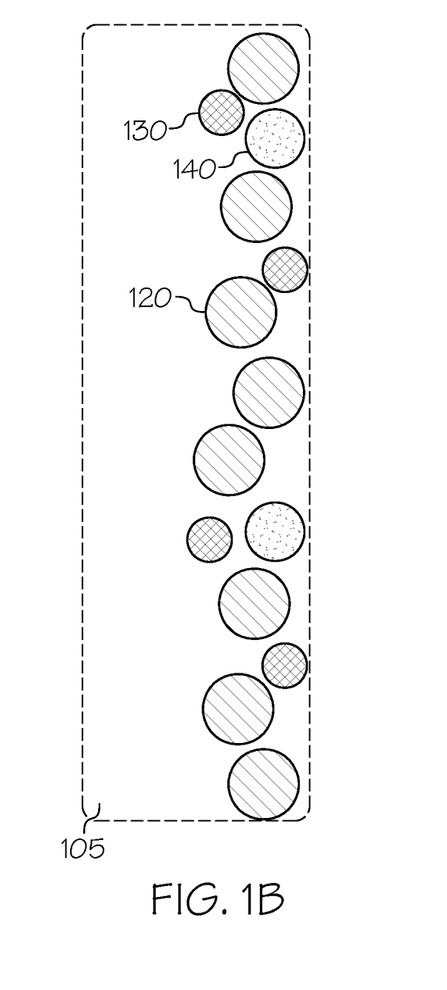
FIG. 1B schematically depicts a non-defective ion-exchanged substrate, according to embodiments disclosed and described herein.

Referring now to FIG. 1B, a non-defective ion-exchanged substrate 105 is schematically depicted. In some embodiments, the non-defective ion-exchanged substrate 105 may have an Ra of less than 0.002 μm. In some embodiments, the non-defective ion-exchanged substrate 105 may have an Ra of less than or equal to 0.0015 μm, or less than or equal to 0.001 μm, or less than or equal to 0.0005 μm. In some embodiments, the non-defective ion-exchanged substrate 105 may consist essentially of non-defective areas. The non-defective ion-exchanged substrate 105 may comprise two or more metal monovalent cations. In some embodiments, the concentration of metal monovalent cations in the non-defective ion-exchanged substrate 105 may be heterogeneous, and may be in accordance with the embodiments described above. The non-defective ion-exchanged substrate 105 may comprise the same or similar composition as described above for the defective ion-exchanged substrate 108.

In some embodiments, a non-defective ion-exchanged substrate 105 may be produced by contacting a defective ion-exchanged substrate 108 with a heated salt comprising at least one monovalent salt. Without being bound by any particular theory, the heated salt bath may reintroduce large or medium metal monovalent cations into the defective area, such as the large metal monovalent cations 120 and the small metal monovalent cations 130, creating a heterogeneous cation composition in the non-defective ion-exchanged substrate 105 to smooth out a defect 440. The defect 440 may be smoothed, meaning that the defect 440 may experience a reduction in length or width, or height or depth, or both. In some embodiments, the defect 440 may be smoothed out and may be removed entirely. Without being bound by any particular theory, the defect 440 may be reduced or removed by delocalizing the stress caused by the difference in the size of the metal monovalent cations.

The defective ion-exchanged substrate 108 may be brought into contact with the salt bath through immersion, spraying, dipping, or other similar means. In other embodiments, the defective ion-exchanged substrate 108 may be fully submerged in the salt bath. The defective ion-exchanged substrate 108 may be brought into contact with the salt bath multiple times, including but not limited to, dipping the defective ion-exchanged substrate 108 into the salt bath. Multiple contacts may be required to fully eradicate the defects 440.

In some embodiments, at least a portion of the defective ion-exchanged substrate 108 may be contacted with the heated salt bath for a period of time from 1 minute to 60 hours. At least a portion of the defective ion-exchanged substrate 108 may be contacted with the heated salt bath for a period of time from 1 minute to 48 hours, or 10 minutes to 40 hours, from 10 minutes to 24 hours, or from 30 minutes to 24 hours, or from 1 hour to 24 hours. In some embodiments, at least a portion of the defective ion-exchanged substrate 108 may be contacted with the heated salt bath for a period of time from 10 minutes to 1 hour or 10 minutes to 30 minutes, or from 30 minutes to 2 hours, or from 30 minutes to 3 hours. In some embodiments, the time selected may be a time sufficient for ions to exchange throughout at least a depth of 1 μm from the surface of the defective ion-exchanged substrate 108. In some embodiments, the time selected may be a time sufficient for ions to exchange throughout at least a depth of 0.05 or at least 0.75 or at least 1.5 or at least 2 or at least 2.5 μm from the surface of the defective ion-exchanged substrate 108.

In some embodiments, the salt bath may comprise at least one monovalent salt. In some embodiments, the monovalent salt may include a monovalent metal, such as an alkali metal. For example, in some embodiments, the salt bath may comprise at least one of $KNO_3$ and $NaNO_3$. The salt bath may comprise 100% $KNO_3$, 100% $NaNO_3$, or a combination of $KNO_3$ and $NaNO_3$. In these embodiments, the concentrations of $KNO_3$ and $NaNO_3$ in the salt bath may be balanced based on the composition of the non-defective ion-exchanged substrate 105 to provide an ion exchange that increases both CS and DOC. Without being bound by any particular theory, $KNO_3$—as compared to $NaNO_3$—comprises a larger alkali metal ion (i.e., $K^+$) that may more readily exchange with medium alkali metal ions in the glass substrate, (such as $Na^+$). Likewise, $NaNO_3$—when compared to $KNO_3$—comprises a medium alkali metal ion (i.e., $Na^+$) that more readily exchanges with smaller alkali metal ions (such as $Li^+$) in the glass substrate. In some embodiments, the salt bath may comprise greater than or equal to 5 mol % $KNO_3$ and less than or equal to 95 mol % $KNO_3$, and greater than or equal to 5 mol % $NaNO_3$ and less than or equal to mol 95% $NaNO_3$. For instance, the salt bath may comprise from greater than or equal to 45 mol % $KNO_3$ to less than or equal to 55 mol % $KNO_3$, and from greater than or equal to 45 mol % $NaNO_3$ to less than or equal to 55 mol % $NaNO_3$. In some embodiments, the salt bath may comprise from greater than or equal to 25 mol % $KNO_3$ to less than or equal to 75 mol % $KNO_3$ and from greater than or equal to 25 mol % $NaNO_3$ to less than or equal to 75 mol % $NaNO_3$. In some embodiments, the salt bath may comprise 49 mol % $KNO_3$ and 51 mol % $NaNO_3$, or 51 mol % $KNO_3$ and 49 mol % $NaNO_3$.

The ion exchange process may promoted by heating the salt bath. In some embodiments, the salt bath may be heated to a temperature of greater than or equal to 95° C. to produce a heated salt bath. In other embodiments, the heated salt bath may be an aqueous salt bath, meaning that the salt bath may comprise water. In some embodiments, the aqueous salt bath may be heated to a temperature of from greater than or equal to 95° C. and less than or equal to 350° C. In some embodiments, the heated salt bath may be a molten salt bath. In some embodiments, the molten salt bath may be heated to a temperature of from 360° C. to 420° C. In some embodiments, if the temperature of the salt bath is increased too much, it may be difficult to adequately control the ion exchange process and the DOC can increase too quickly without obtaining a good CS. Accordingly, the salt bath may, in some embodiments, be heated to a temperature of less than or equal to 430° C., such as a temperature of from greater than or equal to 95° C. to less than or equal to 430° C., or from greater than or equal to 360° C. and less than or equal to 430° C. In some embodiments, the salt bath may be heated to a temperature of greater than or equal to 360° C. to less than or equal to 390° C., or of greater than or equal to 95° C. to less than or equal to 400° C., or of greater than or equal to 150° C. to less than or equal to 385° C., or of greater than or equal to 100° C. to less than or equal to 400° C.

In some embodiments, new or fresh heated salt may be periodically used in order to prevent the formation of salt crystals 247 from forming on the surface of the defective ion-exchanged substrate 108. In some embodiments, the salt bath may not contain phosphate or calcium to prevent the formation of salt crystals 247 from forming on the surface of the defective ion-exchanged substrate 108. In some embodiments, the salt bath may contain less than 10 mol % of phosphate-based or calcium-based salts, including but not limited to potassium phosphate ($K_3PO_4$), sodium phosphate ($Na_3PO_4$), lithium phosphate ($Li_3PO_4$), mixed alkali metal phosphates ($Li_2NaPO_4$), calcium chloride ($CaCl_2$), or combinations thereof. In some embodiments, the salt bath may contain less than 15 mol % or less than 8 mol %, or less than 5 mol %, or less than 3 mol % phosphate-based or calcium-based salts.

Figure 2A:
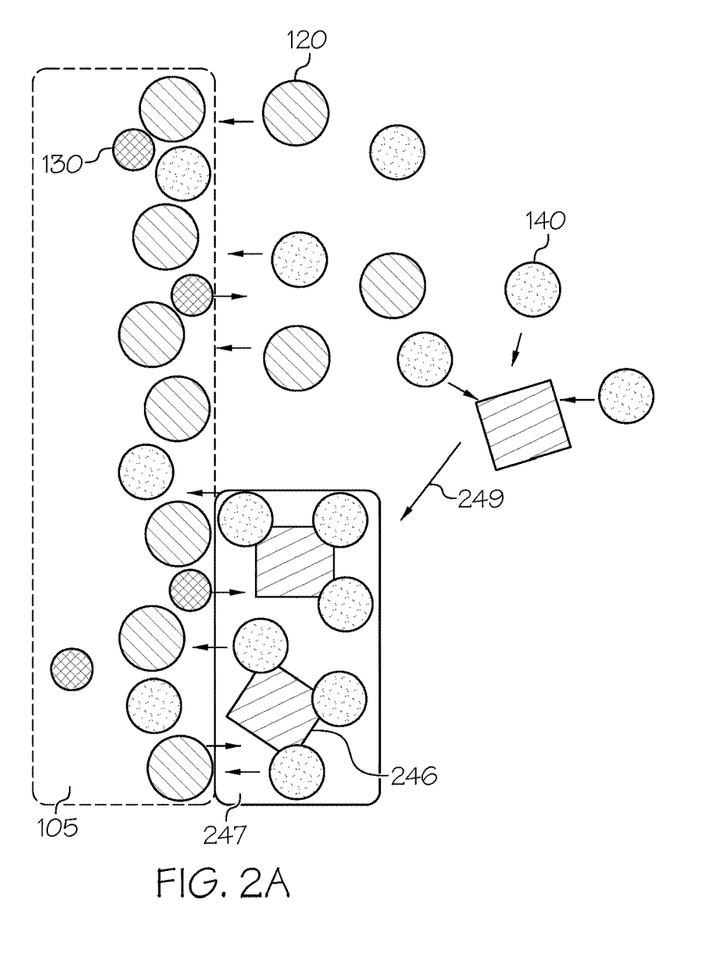
FIG. 2A schematically depicts an ion-exchanged substrate with a salt crystal on the surface, according to embodiments disclosed and described herein.

FIG. 2A schematically depicts a salt crystal 247 forming on the surface of a non-defective ion-exchanged substrate 105. As previously mentioned, during and immediately following the ion exchange process, salt crystals 247 may form in the heated salt bath and may attach or otherwise adhere to the non-defective ion-exchanged substrate 105. The salt crystals 247 may comprise calcium ions, phosphate ions, or combinations thereof. The salt crystals 247 may be any potential contaminant comprised of ions used and generated during ion exchange processes. The salt crystals 247 may comprise the large metal monovalent cations, the medium-sized metal monovalent cations, or the small metal monovalent cations. The salt crystals 247 may be formed due to attractions between ions present in the heated salt bath, as depicted by arrow 249. The salt crystals 247 may comprise homogenous salts 246, such as trisodium phosphate (TSP, $Na_3PO_4$) or tripotassium phosphate ($K_3PO_4$). In some embodiments, the homogenous salt 246 may comprise calcium ions, such as calcium chloride ($CaCl_2$)). The homogenous salts 246 may comprise small metal monovalent cations, large metal monovalent cations, or medium-sized metal monovalent cations. The homogenous salts 246 may form in the heated salt bath and may adhere to the surface of an ion-exchangeable substrate.

As a non-limiting example, in some embodiments, trisodium phosphate may be added to the salt bath to precipitate out lithium cations. After precipitation of the lithium cations, the excess trisodium phosphate present in the salt bath may form salt crystals 247, which may adhere to the surface of an ion-exchangeable substrate. The trisodium phosphate crystals may interact with the ion-exchangeable substrate, causing potassium cations, which may preferably react with the phosphate anions, to diffuse from the ion-exchangeable substrate while the sodium cations diffuse into the ion-exchangeable substrate. The increased concentration of sodium cations in the ion-exchangeable substrate may create a depression in the ion-exchanged substrate caused by the volumetric difference between sodium cations and potassium cations.

Figure 2B:
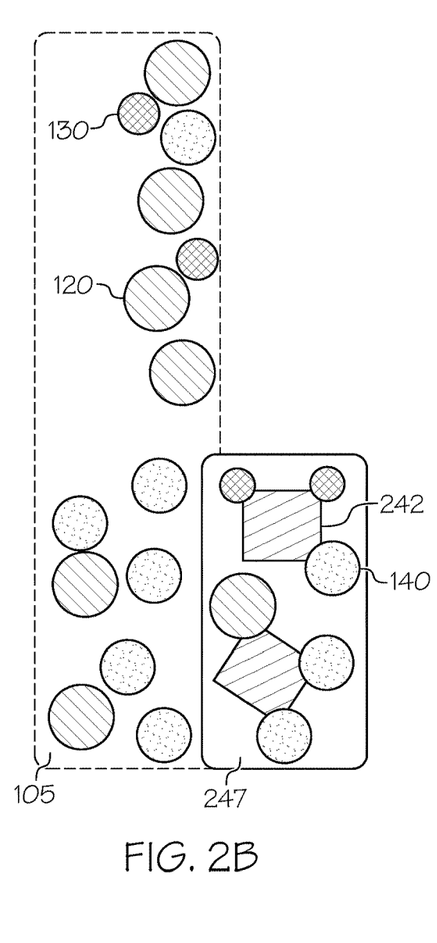
FIG. 2B schematically depicts an ion exchange reaction occurring between a salt crystal and an ion-exchanged substrate, according to embodiments disclosed and described herein.
Figure 2C:
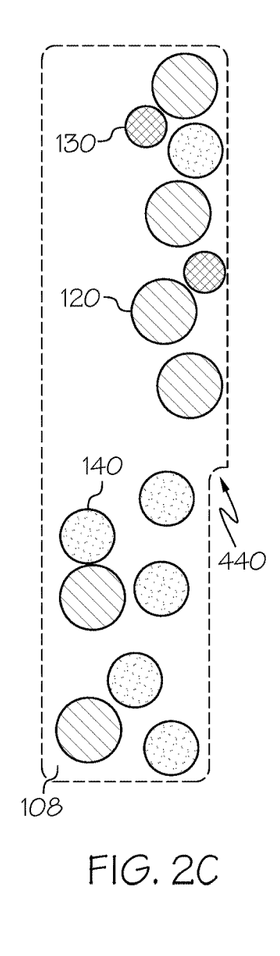
FIG. 2C schematically depicts the removal of a salt crystal to reveal a surface defect in the ion-exchanged substrate, according to embodiments disclosed and described herein.

FIG. 2B depicts a non-defective ion-exchanged substrate 105 with salt crystals 247 adhered to its surface. Without being bound by any particular theory, salt crystals 247 may adhere to the surface of the non-defective ion-exchanged substrate 105, and cations present in the salt crystal 247 may begin to exchange with ions present in the non-defective ion-exchanged substrate 105. This exchange of ions may concentrate stress in a particular localized area of the non-defective ion-exchanged substrate 105, which may cause a defect 440 to form, as previously discussed and as shown in FIG. 2C.

In some embodiments, the salt crystals 247 may comprise heterogeneous salts 242. The heterogeneous salts 242 may be formed from combinations of two or more small metal monovalent cations 130, large metal monovalent cations 120, or medium-sized metal monovalent cations 140. In embodiments in which phosphate is the anion present in the salt crystal 247, the homogenous salt 246 may comprise, for instance, trilithium phosphate $Li_3PO_4$, trisodium phosphate $Na_3PO_4$, or tripotassium phosphate $K_3PO_4$, and the heterogeneous salt 242 may comprise lithium sodium phosphate $Li_2NaPO_4$, potassium sodium phosphate $K_2NaPO_4$, or combinations thereof.

As shown in FIG. 2B, as ions exchange between the salt crystal 247 and the non-defective ion-exchanged substrate 105, the concentration of large metal monovalent cations 120, medium-sized metal monovalent cations 140, and small metal monovalent cations 130 may be altered such that the once heterogeneous, balanced composition in substrate 105 now has (in a particular area) a plurality or majority (at least 51%) concentration of one type of metal monovalent cation, such as the medium-sized metal monovalent cations 140 shown in FIG. 2B.

Without being bound by any particular theory, in some embodiments, the salt crystals 247 may initially contain homogenous salts 246 comprising only one metal monovalent cation, such as the medium-sized metal monovalent cations 140. Upon adhering to the surface of the non-defective ion-exchanged substrate 105, the medium-sized metal monovalent cations 140 and small metal monovalent cations 130 present in the salt crystals 247 may exchange with the large metal monovalent cations 120 present in the non-defective ion-exchanged substrate 105 to form heterogeneous salts 242. The anion present in the salt crystals 247 may selectively bond with the large metal monovalent cations 120 over the medium-sized metal monovalent cations 140 and small metal monovalent cations 130.

In FIG. 2C, as the salt crystals 247 are removed, defects 440 may be revealed in the surface of the substrate, resulting in a defective ion-exchanged substrate 108. In some embodiments, the non-defective ion-exchanged substrate 105 may be removed from the heated salt bath and cooled with the salt crystals 247 present on the surface. The salt crystals 247 may then be washed with water, such as deionized water, to remove the salt crystals 247 from the surface of the defective ion-exchanged substrate 108. In some embodiments, the salt crystals 247 may be difficult to remove.

EXAMPLES

The following examples further illustrate one or more embodiments disclosed above. The examples are illustrative in nature and are in no way intended to limit the scope of the present disclosure.

Example 1

Figure 3:
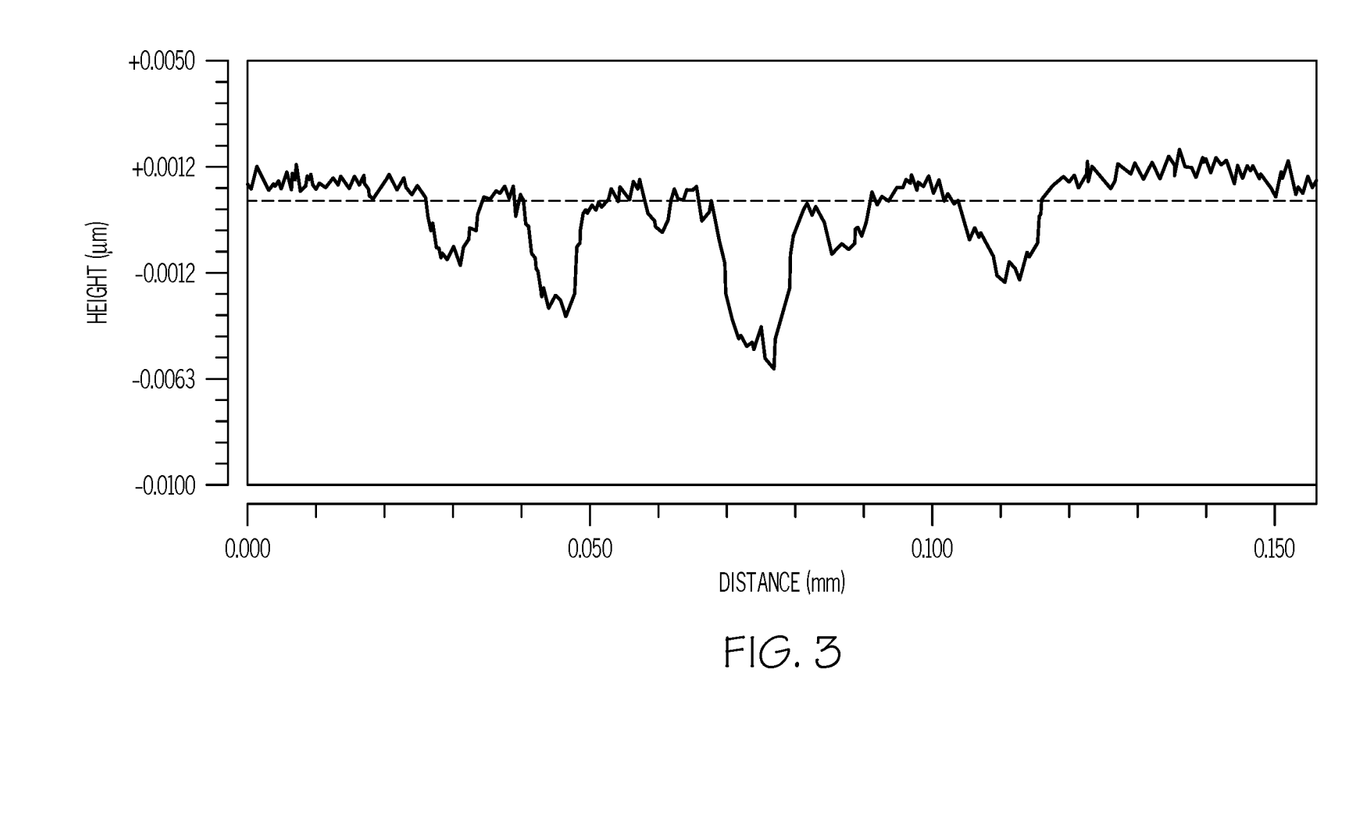
FIG. 3 is graph of the surface profile of a defective ion-exchanged substrate, as measured using Zygo 3D imaging and surface metrology, according to embodiments disclosed and described herein.

A 3 kilogram (kg) salt bath containing 49 wt % $NaNO_3$ and 51 wt % $KNO_3$ was heated to form a molten salt bath and then maintained at a temperature of about 380° C. A glass substrate, Example Glass 1, the composition of which is listed below in Table 1, was contacted with the molten salt bath for 3.75 hours. As the ion-exchanged process occurred, lithium ions diffused from the glass substrate into the molten salt bath. To prevent lithium bath poisoning, which may lower the CS and DOC of the substrate, 0.5 wt % trisodium phosphate was added to the bath. While lithium phosphate precipitated from the bath, an excess concentration of phosphate ions began to form lithium sodium phosphate, $Li_2NaPO_4$, and potassium sodium phosphate, $K_2NaPO_4$. The Example Glass 1 was removed from the molten salt bath, cooled to a temperature of 100° C. in less than 7 minutes. The glass was washed with deionized water and, upon washing, surface defects could be noticed in the surface of Example Glass 1. FIG. 3 is a graph of the surface configuration determined by Zygo characterization.

TABLE 1

| Composition of Example Glass 1 | |
|---|---|
| Example Glass 1 | Mol % Oxide |
| $SiO_2$ | 63.46 |
| $Al_2O_3$ | 15.71 |
| $B_2O_3$ | 0 |
| $Li_2O$ | 6.37 |
| $Na_2O$ | 10.69 |
| MgO | 0.06 |
| ZnO | 1.15 |
| $P_2O_5$ | 2.45 |
| $SnO_2$ | 0.04 |

FIG. 3 depicts a graph of the characterization of the surface defects present on a glass substrate Example Glass 1, the composition of which is listed above in Table 1. FIG. 3 is a graph of the Zygo measurements, a 3-dimensional (3D) imaging and surface metrology tool which depicts the surface profile of the glass sheet.

As shown in FIG. 3, Example Glass 1 exhibited multiple depressions (measurements below the dashed line). The depressions ranged from a depth (HEIGHT in micrometers along the Y-axis) of 0.0001 µm to greater than 0.006 µm with a length/width (DISTANCE in millimeters along the X-axis) ranging from 0.001 mm to greater than 0.01 mm. Most depressions had a length of a few micrometers and a depth of a few nanometers. The defects contained a majority concentration of sodium ions and were deficient in lithium and potassium ions.

Figure 4:
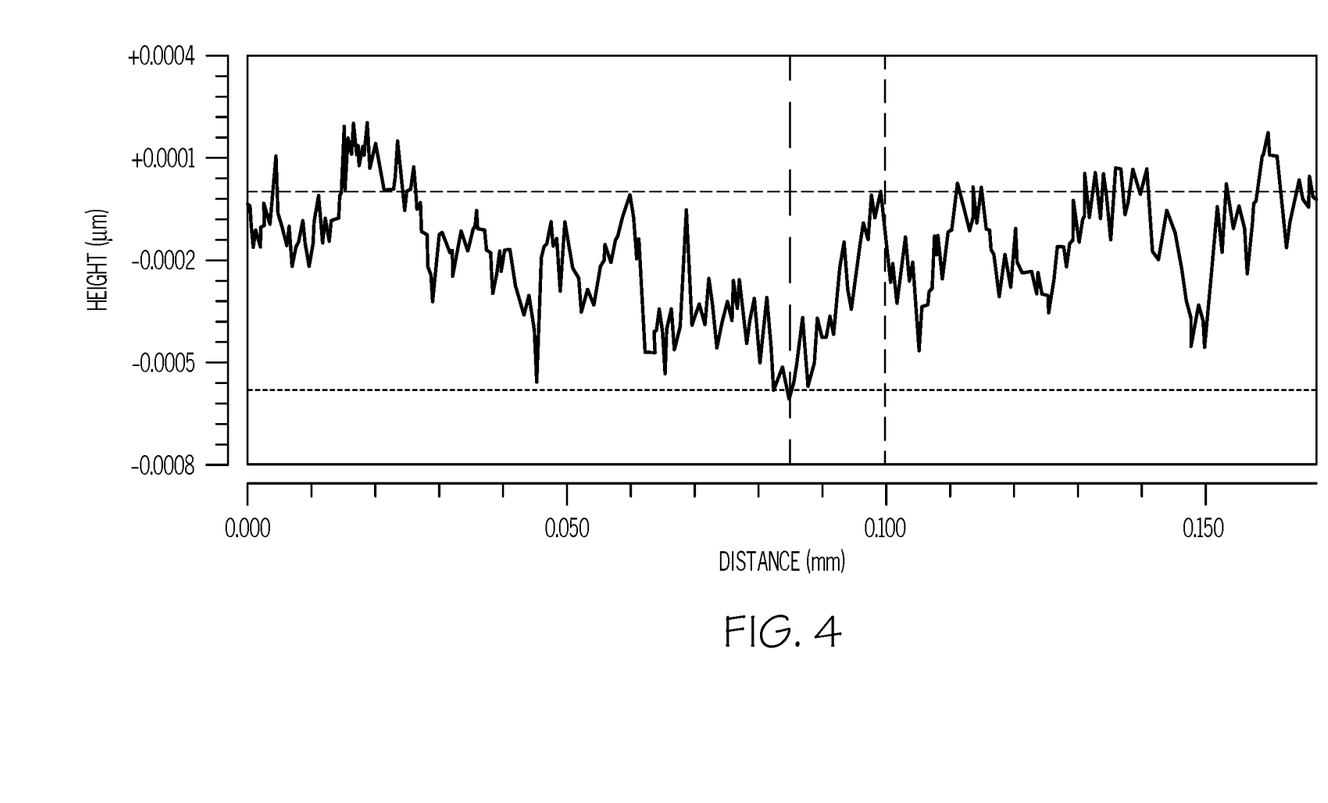
FIG. 4 is graph of the surface profile of a non-defective ion-exchanged substrate, as measured using Zygo 3D imaging and surface metrology, according to embodiments disclosed and described herein.

FIG. 4 depicts a Zygo image of the same Example Glass 1 substrate following treatment in accordance with embodiments described herein. Following the previously described treatment, Example Glass 1 was placed in a molten salt bath comprising 100% $KNO_3$ at 380° C. for 30 minutes. Example Glass 1 was then removed, cooled and washed with deionized water. After removal from the bath, the surface defects were no longer observable in Example Glass 1. The substrate exhibited a heterogeneous ion composition with balanced concentrations of sodium, lithium, and potassium ions. The Zygo image of the non-defective Example Glass 1 substrate is shown in FIG. 4. Notably, Example Glass 1 substrate did not comprises defects of larger than about 0.0005 µm in depth or height or about 0.0050 mm in length/width.

Example 2

A 3 kilogram (kg) salt bath containing 49 wt % $NaNO_3$ and 51 wt % $KNO_3$ was heated to form a molten salt bath and then maintained at a temperature of about 380° C. A glass substrate, Example Glass 2, the composition of which is listed below in Table 2, was contacted with the molten salt bath for 3.75 hours. As the ion-exchanged process occurred, lithium ions diffused from the glass substrate into the molten salt bath. To prevent lithium bath poisoning 0.5 wt % trisodium phosphate was added to the bath. As lithium phosphate precipitated from the bath, an excess concentration of phosphate ions formed lithium sodium phosphate, $Li_2NaPO_4$, and potassium sodium phosphate, $K_2NaPO_4$. Example Glass 2 was removed from the molten salt bath, cooled to a temperature of 100° C. in less than 7 minutes. The glass was washed with deionized water and, upon washing, surface defects were visible.

Figure 5A:
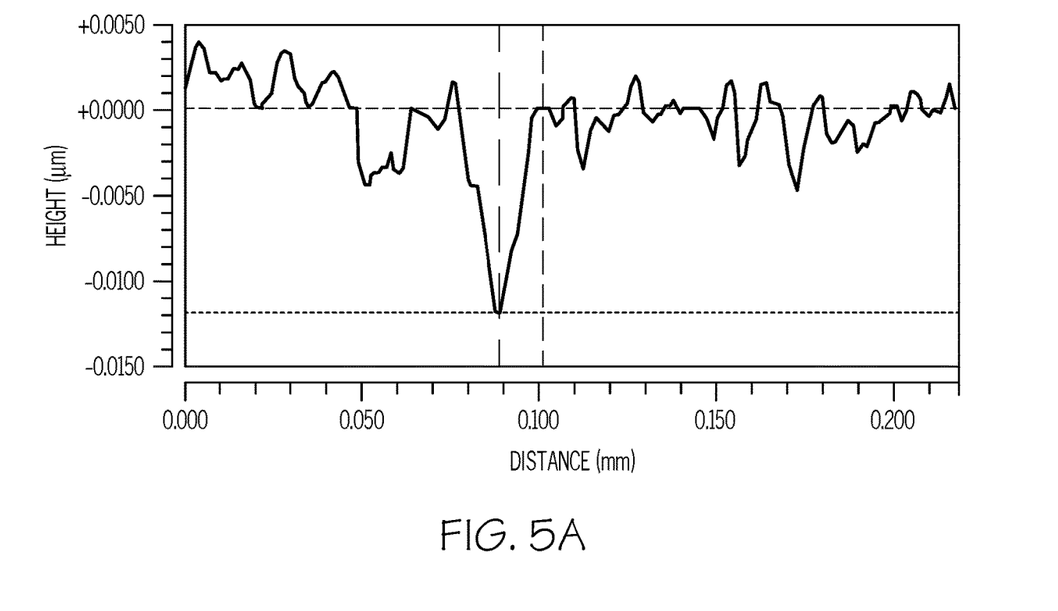
FIG. 5A is a graph of the surface profile of a defective ion-exchanged substrate, as measured using Zygo 3D imaging and surface metrology, according to embodiments disclosed and described herein.
Figure 5B:
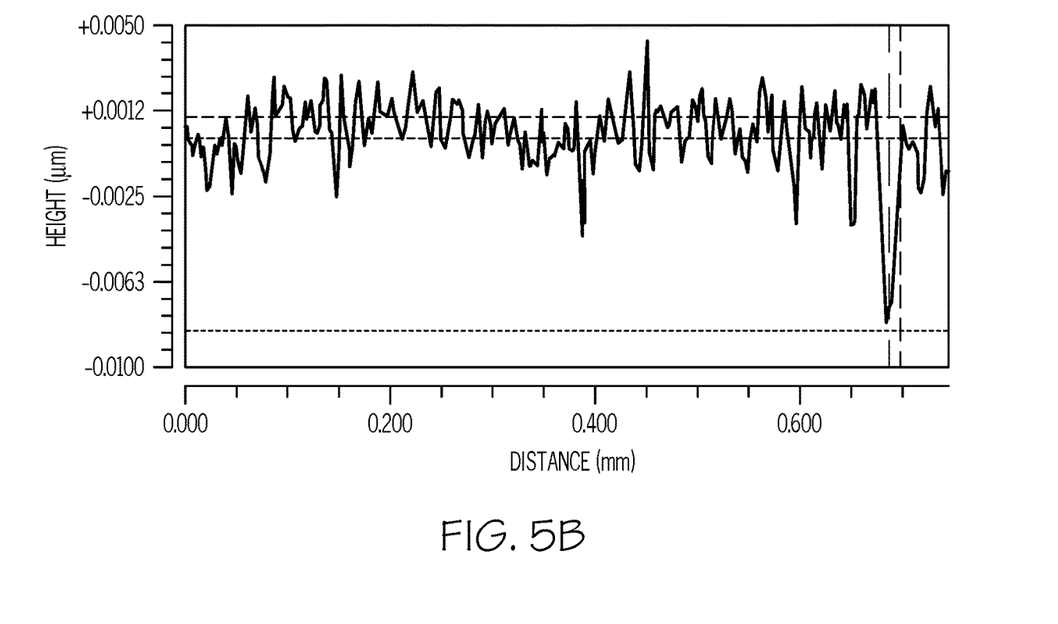
FIG. 5B is graph of the surface profile of the previously defective ion-exchanged substrate, which is now a non-defective ion-exchanged substrate, as measured using Zygo 3D imaging and surface metrology according to embodiments disclosed and described herein.

FIG. 5A is a Zygo surface roughness of the defective ion-exchanged Example Glass 2. As shown in FIG. 5A, multiple defects were present in Example Glass 2, with one particularly large depression of about 10 nm in depth and a few microns wide. FIG. 5B depicts the same Example Glass 2 substrate after being placed in a molten salt bath comprising 100% $KNO_3$ at 380° C. for 30 minutes. Following ion exchange treatment with the molten salt bath, Example Glass 2 was removed, cooled and washed with deionized water. As shown in FIG. 5B, the method removed and reduced a majority of the surface defects. Example Glass 2 no longer contained a depression of about 10 nm and over 0.2 mm wide, but the largest defect present was about 0.6 nm deep and less than 0.05 mm in length. In FIG. 5A, the large surface defects were observable to the unassisted eye, whereas in FIG. 5B the small surface defects were not observed.

TABLE 2

| Composition of Example Glass 2 | |
|---|---|
| Example Glass 2 | Mol % Oxide |
| $SiO_2$ | 70.91 |
| $Al_2O_3$ | 12.78 |
| $B_2O_3$ | 1.95 |
| $Li_2O$ | 7.95 |
| $Na_2O$ | 2.43 |

TABLE 2-continued

Composition of Example Glass 2

| Example Glass 2 | Mol % Oxide |
| --- | --- |
| MgO | 2.98 |
| ZnO | 0.89 |
| $P_2O_5$ | 0 |
| $SnO_2$ | 0.10 |

Figure 6:
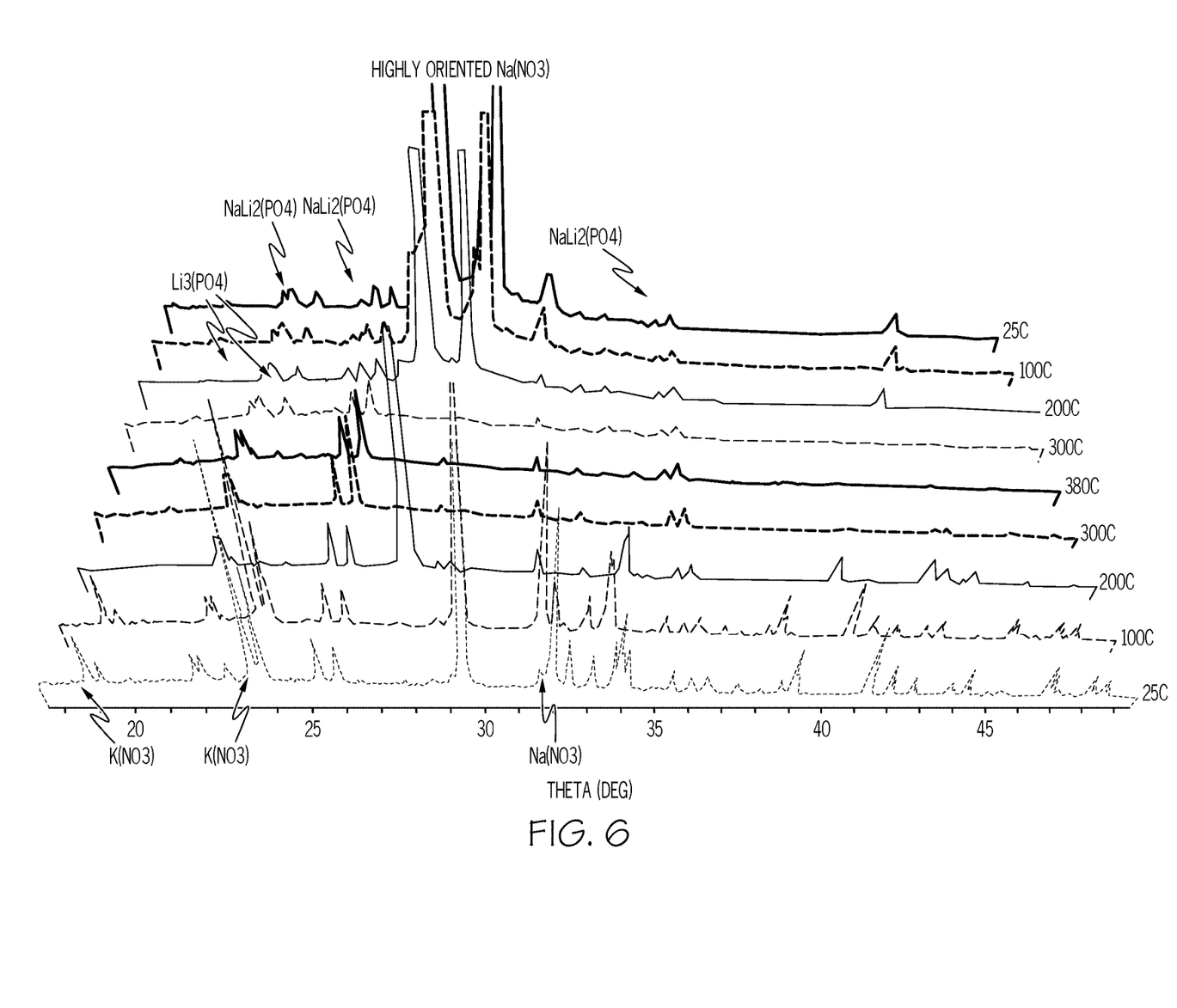
FIG. 6 is a graph of a high temperature x-ray diffraction analysis of a molten salt bath containing $KNO_3$, $NaNO_3$, and a small amount of lithium sodium phosphate, according to embodiments shown and described herein.

FIG. 6 depicts an in-situ high temperature x-ray diffraction (XRD) pattern as a function of temperature and intensity for a heated salt bath containing molten $KNO_3$, $NaNO_3$, and a small amount of $Li_2NaPO_4$. As shown in FIG. 6, at higher bath temperatures, such as about 380° C., the only crystals that were present in the molten salt bath were lithium sodium phosphate, $Li_2NaPO_4$ salts, which remained in a crystalline form. At lower temperatures, the crystals from the other salts (such as $KNO_3$, $NaNO_3$ and $Li_3PO_4$) were more prevalent. As the salt bath was heated to a temperature of 380° C. and then cooled to room temperature, above 300° C. only lithium sodium phosphate remained present in a crystalline state. Below 300° C., both when the bath was being cooled from 380° C. and when the salt bath was being heated from room temperature, other crystalline phases existed from crystalline salts present in the salt bath.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents. Some non-limiting embodiments include:

Embodiment 1

A method for removing a defective area in a strengthened substrate comprising:
heating a salt bath comprising at least one monovalent salt to a temperature of from greater than or equal to 95° C.;
contacting at least a portion of a strengthened substrate with the salt bath, wherein, before the strengthened substrate is contacted with the salt bath, the strengthened substrate has one or more non-defective areas having an average concentration of total metal monovalent cations, and at least one defective area having an average concentration of total metal monovalent cations that deviates from the average concentration of the one or more non-defective areas by greater than or equal to 10 mol %;
removing the at least a portion of the strengthened substrate from the salt bath, wherein, after removal, the at least one defective area has an average concentration of total metal monovalent cations that deviates from the an average concentration of total metal monovalent cations of the one or more non-defective areas by less than 10 mol %.

Embodiment 2

The method of embodiment 1, wherein the average concentration of the at least one defective area comprises greater than or equal to 60 mol % of a first metal monovalent cation before the strengthened substrate is contacted with the salt bath and after removing the at least a portion of the strengthened substrate from the salt bath, the average concentration of the at least one defective area comprises less than 60 mol % of the first metal monovalent cation.

Embodiment 3

The method of embodiment 2, wherein the first metal monovalent cation comprises an alkali metal.

Embodiment 4

The method of any one of the preceding embodiments, wherein, before the strengthened substrate is contacted with the salt bath, the at least one defective area has a first metal monovalent cation concentration that deviates from the average metal monovalent cation concentration of the one or more non-defective areas by greater than or equal to 20%.

Embodiment 5

The method of any one of the preceding embodiments, wherein, upon removing the at least a portion of the strengthened substrate from the salt bath the at least one defective area has a second metal monovalent cation concentration that deviates from the average metal monovalent cation concentration of total metal monovalent cations of the one or more non-defective areas by less than 5%.

Embodiment 6

The method of any one of the preceding embodiments, wherein the strengthened substrate has an Arithmetic Average Roughness (Ra) of greater than or equal to 0.002 μm before contact with the salt bath and an Ra of less than 0.002 μm after removal from the salt bath, as measured over an area having dimensions of 0.18 mm by 0.13 mm.

Embodiment 7

A method for producing a non-defective ion-exchanged substrate comprising:
heating a salt bath comprising at least one monovalent salt to a temperature of from greater than or equal to 95° C. and less than or equal to 430° C.;
contacting at least a portion of a defective ion-exchanged substrate with the salt bath, wherein, the defective ion-exchanged substrate has an Arithmetic Average Roughness (Ra) of greater than or equal to about 0.002 μm, as measured over an area having dimensions of 0.18 mm by 0.13 mm; and
removing the at least a portion of the ion-exchanged substrate from the salt bath to produce a non-defective ion-exchanged substrate having an Ra of less than 0.002 μm.

Embodiment 8

The method of embodiment 7, wherein the defective ion-exchanged substrate comprises at least one defect having a height or depth of greater than or equal to at least 1.2 nm and a width or length of greater than or equal to 5 μm.

Embodiment 9

The method of embodiment 7 or embodiment 8, wherein the non-defective ion-exchanged substrate does not comprise a defect having a height or depth of greater than or equal to at least 8 nm and a width or length of greater than or equal to 0.01 mm.

Embodiment 10

The method of any one of embodiments 1-9, wherein the salt bath does not comprise a saturated salt.

Embodiment 11

The method of any one of embodiments 1-10, wherein the salt bath does not comprise phosphate or calcium.

Embodiment 12

The method of any one of embodiments 1-11, wherein the at least a portion of the defective ion-exchanged substrate is contacted with the salt for 10 minutes to 40 hours.

Embodiment 13

The method of any one of embodiments 1-12, wherein the salt bath is a molten salt bath and is heated at a temperature of from greater than or equal to 360° C. and less than or equal to 430° C.

Embodiment 14

The method of any one of embodiments 1-13, wherein the salt bath is an aqueous salt bath and is heated to a temperature of from greater than or equal to 95° C. and less than or equal to 350° C.

Embodiment 15

The method of any one of embodiments 1-14, wherein the salt bath comprises at least one of Li, Na, K, Rb, Cs, Fr, Ag(I), Au(I), Cu(I), and combinations thereof.

Embodiment 16

The method of any one of embodiments 1-15, wherein the salt bath comprises at least one of $KNO_3$ and $NaNO_3$.

Embodiment 17

The method of any one of embodiments 1-16, wherein the salt bath comprises from about 45 mol % to about 55 mol % $NaNO_3$ and from about 45 mol % to about 55 mol % $KNO_3$.

Embodiment 18

The method of any one of embodiments 1-17, wherein the defective ion-exchanged substrate comprises glass, glass-ceramic, or combinations thereof.

Embodiment 19

The method of any one of embodiments 1-18, wherein the defective ion-exchanged substrate comprises
  greater than or equal to 50 mol % $SiO_2$ and less than or equal to 80 mol % $SiO_2$;
  greater than or equal to 0 mol % $B_2O_3$ and less than or equal to 5 mol % $B_2O_3$;
  greater than or equal to 5 mol % $Al_2O_3$ and less than or equal to 30 mol % $Al_2O_3$;
  greater than or equal to 2 mol % $Li_2O$ and less than or equal to 25 mol % $Li_2O$;
  greater than or equal to 0 mol % $Na_2O$ and less than or equal to 15 mol % $Na_2O$;
  greater than or equal to 0 mol % MgO and less than or equal to 5 mol % MgO;
  greater than or equal to 0 mol % ZnO and less than or equal to 5 mol % ZnO;
  greater than or equal to 0 mol % $SnO_2$ and less than or equal to 5 mol % $SnO_2$; and
  greater than or equal to 0 mol % $P_2O_5$ and less than or equal to 10 mol % $P_2O_5$.

What is claimed is:

1. A method for removing a defective area in a strengthened glass-ceramic substrate comprising:
  heating a salt bath comprising at least one monovalent salt to a temperature of from greater than or equal to 95° C.;
  contacting at least a portion of a strengthened glass-ceramic substrate with the salt bath, wherein, before the strengthened glass-ceramic substrate is contacted with the salt bath, the strengthened glass-ceramic substrate has one or more non-defective areas having an average concentration of total metal monovalent cations, and at least one defective area having an average concentration of total metal monovalent cations that deviates from the average concentration of the one or more non-defective areas by greater than or equal to 10 mol %; and
  removing the at least a portion of the strengthened glass-ceramic substrate from the salt bath, wherein, after removal, the at least one defective area has an average concentration of total metal monovalent cations that deviates from the average concentration of total metal monovalent cations of the one or more non-defective areas by less than 10 mol %, wherein the average concentration of the at least one defective area comprises greater than or equal to 60 mol % of a first metal monovalent cation before the strengthened glass-ceramic substrate is contacted with the salt bath and after removing the at least a portion of the strengthened glass-ceramic substrate from the salt bath, the average concentration of the at least one defective area comprises less than 60 mol % of the first mental monovalent cation.

2. The method of claim 1, wherein the first metal monovalent cation comprises an alkali metal.

3. The method of claim 1, wherein, before the strengthened glass-ceramic substrate is contacted with the salt bath, the at least one defective area has a first metal monovalent cation concentration that deviates from the average metal monovalent cation concentration of the one or more non-defective areas by greater than or equal to 20 mol %.

4. The method of claim 1, wherein, upon removing the at least a portion of the strengthened glass-ceramic substrate from the salt bath the at least one defective area has a second metal monovalent cation concentration that deviates from the average metal monovalent cation concentration of total metal monovalent cations of the one or more non-defective areas by less than 5 mol %.

5. A method for removing a defective area in a strengthened glass-ceramic substrate comprising:
  heating a salt bath comprising at least one monovalent salt to a temperature of from greater than or equal to 95° C.,
  contacting at least a portion of a strengthened glass-ceramic substrate with the salt bath, wherein, before the strengthened glass-ceramic substrate is contacted with the salt bath, the strengthened glass-ceramic substrate has one or more non-defective areas having an average concentration of the one or more non-defective areas by greater than or equal to 10 mol %; and removing the at least a portion of the strengthened glass-ceramic substrate from the salt bath, wherein, after removal, the at least one defective area has an average concentration of total metal monovalent cations that deviates from the average concentration of total metal monovalent cations of the one or more non-defective areas by less than 10 mol %, wherein the strengthened glassceramic substrate has an Arithmetic Average Roughness (Ra) of greater than or equal to 0.002 µm before contact with the salt bath and an Ra of less than 0.002 µm after removal from the salt bath, as measured over an area having dimensions of 0.18 mm by 0.13 mm.

6. The method of claim 5, wherein the strengthened glass-ceramic substrate comprises at least one defect having a height or depth of greater than or equal to at least 1.2 nm and a width or length of greater than or equal to 5 µm.

7. The method of claim 5, wherein after removal from the salt bath, the strengthened glass-ceramic substrate does not comprise a defect having a height or depth of greater than or equal to at least 8 nm and a width or length of greater than or equal to 0.01 mm.

8. The method of claim 5, wherein the salt bath does not comprise a saturated salt.

9. The method of claim 5, wherein the salt bath does not comprise phosphate or calcium.

10. The method of claim 5, wherein the at least a portion of the strengthened glass-ceramic substrate is contacted with the salt bath for 10 minutes to 40 hours.

11. The method of claim 5, wherein the salt bath is a molten salt bath and is heated at a temperature of from greater than or equal to 360° C. and less than or equal to 430° C.

12. The method of claim 5, wherein the salt bath is an aqueous salt bath and is heated to a temperature of from greater than or equal to 95° C. and less than or equal to 350° C.

13. The method of claim 5, wherein the salt bath comprises at least one of Li, Na, K, Rb, Cs, Fr, Ag(I), Au(I), Cu(I), and combinations thereof.

14. The method of claim 5, wherein the salt bath comprises at least one of $KNO_3$ and $NaNO_3$.

15. The method of claim 14, wherein the salt bath comprises from about 45 mol % to about 55 mol % $NaNO_3$ and from about 45 mol % to about 55 mol % $KNO_3$.

16. The method of claim 5, wherein the strengthened glass-ceramic substrate comprises greater than or equal to 50 mol % $SiO_2$ and less than or equal to 80 mol % $SiO_2$;

greater than or equal to 0 mol % $B_2O_3$ and less than or equal to 5 mol % $B_2O_3$;

greater than or equal to 5 mol % $Al_2O_3$ and less than or equal to 30 mol % $Al_2O_3$;

greater than or equal to 2 mol % $Li_2O$ and less than or equal to 25 mol % $Li_2O$;

greater than or equal to 0 mol % $Na_2O$ and less than or equal to 15 mol % $Na_2O$;

greater than or equal to 0 mol % MgO and less than or equal to 5 mol % MgO;

greater than or equal to 0 mol % ZnO and less than or equal to 5 mol % ZnO;

greater than or equal to 0 mol % $SnO_2$ and less than or equal to 5 mol % $SnO_2$; and greater than or equal to 0 mol % $P_2O_5$ and less than or equal to 10 mol % $P_2O_5$.

* * * * *

UNITED STATES PATENT AND TRADEMARK OFFICE
CERTIFICATE OF CORRECTION

PATENT NO. : 11,261,129 B2
APPLICATION NO. : 16/506116
DATED : March 1, 2022
INVENTOR(S) : Jaymin Amin et al.

It is certified that error appears in the above-identified patent and that said Letters Patent is hereby corrected as shown below:

In the Claims

In Column 16, Line 40, in Claim 1, delete "mental" and insert -- metal --.

In Column 16, Line 66, in Claim 5, delete "of the" and insert -- of total metal monovalent cations, and at least one defective area having an average concentration of total metal monovalent cations that deviates from the average concentration of the --.

In Column 17, Line 6, in Claim 5, delete "monivalent" and insert -- monovalent --.

In Column 17, Line 8, in Claim 5, delete "glassceramic" and insert -- glass-ceramic --.

Signed and Sealed this
Thirteenth Day of December, 2022

Katherine Kelly Vidal
*Director of the United States Patent and Trademark Office*